(12) United States Patent
Galand et al.

(10) Patent No.: US 7,593,321 B2
(45) Date of Patent: Sep. 22, 2009

(54) METHOD AND SYSTEM FOR A LOCAL AND FAST NON-DISRUPTIVE PATH SWITCHING IN HIGH SPEED PACKET SWITCHING NETWORKS

(75) Inventors: Claude Galand, La Colle/Loup (FR); Olivier Bertin, Eybens (FR); Olivier Maurel, Le Cannet (FR); Laurent Nicolas, Villeneuve-Loubet (FR); Aline Fichou, La Colle/Loup (FR)

(73) Assignee: Cisco Technology, Inc., San Jose, CA (US)

( * ) Notice: Subject to any disclaimer, the term of this patent is extended or adjusted under 35 U.S.C. 154(b) by 929 days.

(21) Appl. No.: 10/634,060

(22) Filed: Aug. 4, 2003

(65) Prior Publication Data

US 2004/0042402 A1    Mar. 4, 2004

Related U.S. Application Data

(63) Continuation of application No. 09/213,578, filed on Dec. 17, 1998, now abandoned.

(30) Foreign Application Priority Data

Feb. 11, 1998    (EP)    ................................. 97480093

(51) Int. Cl.
*H04L 12/407*    (2006.01)
(52) U.S. Cl. ........................ 370/218; 370/228; 370/225; 370/400; 709/239; 340/825.01
(58) Field of Classification Search .................. 370/228, 370/225, 238, 248, 229, 216–218, 221, 227, 370/392, 254–256, 400, 406, 409, 410; 709/239–244; 340/825.01
See application file for complete search history.

(56) References Cited

U.S. PATENT DOCUMENTS

| 4,939,726 | A |   | 7/1990  | Flammer et al. |
|-----------|---|---|---------|----------------|
| 5,235,599 | A | * | 8/1993  | Nishimura et al. .......... 370/218 |
| 5,239,537 | A |   | 8/1993  | Sakauchi |
| 5,241,534 | A |   | 8/1993  | Omuro et al. |
| 5,309,433 | A |   | 5/1994  | Cidon et al. |
| 5,375,070 | A |   | 12/1994 | Hershey et al. |
| 5,420,988 | A |   | 5/1995  | Elliott |
| 5,550,815 | A |   | 8/1996  | Cloonan et al. |
| 5,600,638 | A |   | 2/1997  | Bertin et al. |
| 5,732,072 | A |   | 3/1998  | Thanner et al. |
| 5,740,171 | A |   | 4/1998  | Mazzola et al. |
| 5,751,710 | A |   | 5/1998  | Crowther et al. |
| 5,805,593 | A |   | 9/1998  | Busche |
| 5,872,773 | A | * | 2/1999  | Katzela et al. ............... 370/256 |
| 5,881,051 | A |   | 3/1999  | Arrowood et al. |

(Continued)

*Primary Examiner*—Ricky Ngo
*Assistant Examiner*—Dady Chery
(74) *Attorney, Agent, or Firm*—Cesari and McKenna LLP

(57) ABSTRACT

A method for operating a node in a computer network is disclosed, where the network is made up of nodes connected by links. The method has the steps: determining an alternate path for one or more links; reserving resources for the alternate path; and rerouting traffic on the alternate path in case of a link failure. The alternate path may be periodically updated. A plurality of alternate paths may be maintained. The alternate paths may not have any links in common. User traffic may be rerouted substantially simultaneously to each link of the alternate path in the event of failure of a primary path.

29 Claims, 14 Drawing Sheets

U.S. PATENT DOCUMENTS

| | | |
|---|---|---|
| 5,901,138 A | 5/1999 | Bader et al. |
| 5,958,064 A | 9/1999 | Judd et al. |
| 5,987,521 A | 11/1999 | Arrowood et al. |
| 6,011,780 A * | 1/2000 | Vaman et al. ............... 370/237 |
| 6,034,961 A | 3/2000 | Masuo et al. |
| 6,044,077 A | 3/2000 | Luijten et al. |
| 6,400,681 B1 | 6/2002 | Bertin et al. |
| 6,430,150 B1 * | 8/2002 | Azuma et al. ............... 370/218 |

* cited by examiner

ALTERNATE PATH DATABASE (APD)

Link table 420

| | link k | link l | link n.... |
|---|---|---|---|
| link identifiers (422) | | | |
| link characteristics (423) | | | |
| C (bps) | | | |
| rf (%) | | | |
| $\hat{C}_R$ (bps) | | | |
| $M_{NR}$ (bps) | | | |
| $\hat{C}_T$ (bps) | | | |
| mps (bytes) | | | |
| parent path (424) | | | |

Path table 410

| | path 1 | path 2 | path 3 ... |
|---|---|---|---|
| parent link (416) | link i | | |
| destination node (412) | node B | | |
| link list (411) | link k<br>link l<br>link m | | |
| path characteristics (413)<br>  max packet size<br>  max delay<br>  jitter<br>  loss probability<br>  hopcount | 512 bytes<br>20 ms<br>20 ms<br>$10^{-6}$<br>2 | | |
| bandwith reservation (414)<br>  bandwith used<br>  per link | 10 Mbps<br>5 Mbps<br>15 Mbps | | |
| remaining available bandwith on path | 20 Mbps | | |
| list of rerouted connections (415) | conn. i<br>conn. j<br>conn. r<br>conn. s | | |

FIG.4

TOPOLOGY DATABASE

TOPOLOGY DATABASE (500)

TABLE OF NETWORK NODES (501)

TABLE OF NETWORK LINKS (502)

LINK 3
LINK 2
LINK 1

(503) LINK PROPERTIES (504) LINK STATE (505) LINK RESERVED BANDWIDTH

FIG.5

TOPOLOGY DATABASE
Link characteristics

| CHARACTERISTIC | | LINK VALUES | | | |
|---|---|---|---|---|---|
| NAME | DESCRIPTION | A | B | ... | N |
| C | Total capacity (bps) | $C_A$ | $C_B$ | ... | $C_N$ |
| rf | Reservable fraction (%) | $rf_A$ | $rf_B$ | ... | $rf_N$ |
| $\hat{C}_R$ | Total reserved bandwidth (bps) | $\hat{C}_{R,A}$ | $\hat{C}_{R,B}$ | ... | $\hat{C}_{R,N}$ |
| $M_{NR}$ | Total bandwidth used by NR traffic (bps) | $M_{NR,A}$ | $M_{NR,B}$ | ... | $M_{NR,N}$ |
| mps | Maximum packet size (bytes) | $mps_A$ | $mps_B$ | ... | $mps_N$ |

FIG.6

METHOD AND SYSTEM FOR A LOCAL AND FAST NON-DISRUPTIVE PATH SWITCHING IN HIGH SPEED PACKET SWITCHING NETWORKS

This Application is a Continuation of U.S. patent application Ser. No. 09/213,578 filed on Dec. 17, 1998 now abandoned.

TECHNICAL FIELD

The present invention relates to high speed packet switching networks and mor particularly to a method and system for locally switching without disruption the user traffic to an alternate path.

BACKGROUND ART

High Speed Packet Switching Networks

Data transmission is now evolving with a specific focus on applications and by integrating a fundamental shift in the customer traffic profile. Driven by the growth of workstations, the local area networks interconnection, the distributed processing between workstations and super computers, the new applications and the integration of various and often conflicting structures—hierarchical versus peer to peer, wide versus local area networks, voice versus data—the data profile has become more bandwidth consuming, bursting, non-deterministic and requires more connectivity. Based on the above, there is strong requirement for supporting distributed computing applications across high speed networks that can carry local area network communications, voice, video and traffic among channel attached hosts, business, engineering workstations, terminals, and small to intermediate file servers. This vision of a high speed multi-protocol network is the driver for the emergence of fast packet switching networks architectures in which data, voice, and video information is digitally encoded, chopped into small packets and transmitted through a common set of nodes and links.

An efficient transport of mixed traffic streams on very high speed lines means for these new network architecture a set of requirements in term of performance and resource consumption which can be summarized as follows a very high throughput and a very short packet processing time, a very large flexibility to support a wide range of connectivity options, an efficient flow and congestion control.

Throughput and Processing Time

One of the key requirement of high speed packet switching networks is to reduce the end to end delay in order to satisfy real-time delivery constraints and to achieve the necessary high nodal throughput for the transport of voice and video. Increases in link speeds have not been matched by proportionate increases in the processing speeds of communication nodes and the fundamental challenge for high speed networks is to minimize the processing time and to take full advantage of the high speed/low error rate technologies, most of the transport and control functions provided by the new high bandwidth network architectures are performed on an end to end basis. The flow control and particularly the path selection and bandwidth management processes are managed by the access points of the network which reduces both the awareness and the function of the intermediate nodes.

Connectivity

In high speed networks, the nodes must provide a total connectivity. This includes attachment of the user's devices, regardless of vendor or protocol, and the ability to have the end user communicated with any other device. The network must support any type of traffic including data, voice, video, fax, graphic or image. Nodes must be able to take advantage of all common carrier facilities and to be adaptable to a plurality of protocols. All needed conversions must be automatic and transparent to the end user.

Congestion and Flow Control

Communication networks have at their disposal limited resources to ensure an efficient packets transmission. An efficient bandwidth management is essential to take full advantage of a high speed network. While transmission costs per byte continue to drop year after year, transmission costs are likely to continue to represent the major expense of operating future telecommunication networks as the demand for bandwidth increases. Thus considerable efforts have been spent on designing flow and congestion control processes, bandwidth reservation mechanisms, routing algorithms to manage the network bandwidth. An ideal network should be able to transmit an useful traffic directly proportional to the traffic offered to the network and this as far as the maximum transmission capacity is reached. Beyond this limit, the network should operate at its maximum capacity whatever the demand is.

Routing Modes

A general problem in the communication networks is to find a path between a source and a destination node. When the network is using datagrams, the path selection must be done individually for each packet. For virtual circuits, the path decision is done once only at the time of the connection (or session) establishment. In both cases, the choice of a routing algorithm is not easy because it must satisfy a large number of often conflicting requirements. However, the routing algorithm must allow to exploit the network in an optimal way, according to a criterion which can vary with the utilization type. In most of the cases, the network is realized in a way to minimize the packet transit time and to transfer the maximum number of packets. In other cases, the objective is to decrease the communication cost, or to develop a reliable network able to operate correctly either in case of catastrophic line, node failure or peaks of traffic.

Because of the variety of the constraints, there are a large number of different routing types like flooding routing, random or stochastic routing, deterministic routing. This last routing technique can be implemented according to particular modes such as fixed or adaptive routing, centralized or distributed routing, node by node or end to end routing, connection oriented or connectionless routing . . . .

Adaptive Routing

Contrary to the Fixed Routing, where the routing rules are established once for all, the purpose of the Adaptive Routing is to satisfy at any time the optimization criteria. Tables are permanently updated according for example, the instantaneous state of the traffic on the links.

Distributed Routing

When the characteristics of the network fluctuate, it is possible to adapt the routing by assigning to one node the responsibility to update periodically the routing tables according to the traffic and the topology. The Distributed Routing is a method in which neighboring nodes are exchanging messages concerning the traffic and the network conditions to update their own routing table.

End-to-End Routing

The Adaptive and Distributed Routing are both currently used together in most high speed networks. In order to minimize the processing time and to take full advantage of the high speed/low error rate technologies, the transport and control functions provided by the high bandwidth networks are performed on an end to end basis. No hop by hop error recovery or retransmission is envisioned in high speed, high performance (low error) links and thus, there is no need for transit nodes to be aware of individual transport connections. The originating node is responsible for calculating the route that a packet must take through the network. The routing of the packets presents two aspects for which a wide range of implementing methods exists:

1. Determining what the route for a given connection shall be,
2. Actually switching the packet within a switching node.

Connection-Oriented Routing

One distinguishing characteristic of a network is the presence or absence of a "connection" between end users. They are many ways of constructing connectionless or connection-oriented networks. In most of cases, packets using different routing modes can share the same data transmission facilities. Most of the high speed connections are established on a reserved path to guarantee the bandwidth and the quality of service requested by the user. The path across the network is computed in response to each connection request by the originating node. The computed path is based on the parameters characterizing the network connection's requirements and on link capacity and load information maintained within each network node. The originating node sends a reservation request to the end node. As the bandwidth request packet flows along the chosen path, each transit node determines whether it has enough capacity to accept the new connection. If the connection is accepted, the requested bandwidth is reserved. Changes are reflected in every node of the network by means of control messages. Once a connection is established, there is no need to place a destination address in the packet header every time a packet is sent. All that is needed is an identifier to specify which connection is to be used for this packet. Due to the low packet overhead, the connection oriented routing technique is particularly adapted to the transmission of very short packets (for example real-time voice connections). This technique requires that connection tables be set up and maintained dynamically in each node and this restricting makes datagram transport quite inefficient. The implementation of flow and congestion control in a connection oriented network is easier than in a connectionless one because network nodes can regulate the flow on individual connections. However, when a link or a node becomes inoperative (goes down) connections that were passing through the affected link or node are typically lost. A new connection must be established through a different route. This takes time and may disrupt the connection at the end user level. The process for rerouting the connection without disrupting it at the end user level is called "Non-Disruptive Path Switch (NDPS)".

Non-Disruptive Path Switch

NDPS Triggering

The Non-Disruptive Path Switch for a network connection with resource reservation is triggered by a number of situations including:

a link or a node along an existing the path fails,
a network management request could cause an NDPS as the result of an operator intervention, for example, to move a path back to an earlier, preferred path,
a resource reservation during a network connection set up failed, in which case NDPS is used to find another path with enough resources available,
a request for a connection bandwidth increase along an existing path fails, resulting in a NDPS for a new path with increased bandwidth,
a path end to end delay changes and becomes incompatible with the committed connection quality-of-service,
a preemption request for a path occurs.

The NDPS is also valid for network connections with no resource reservation, and then the first two of these reasons apply.

New Path Establishment

The NDPS procedure, applied at connection level, consists in taking down the existing path and performing a new path set up. These activities can be performed in parallel or in sequence:

If the existing path is inoperative, for example after a link failure, the path takedown and the new path set up activities will be performed in parallel.

If the existing path is still operational, for example after a failed bandwidth increase request, the existing path will still be used while the the new path is being be set up. When the new path is set up, the network connection is switched to the new path, and then the first path is taken down.

When a path is taken down, a request is sent to all the transit nodes handling the connection along the path to release the reserved network resources (in term of bandwidth, labels . . . ) associated with this specific connection. The path set up is very similar to the original network connection set up. The process is initiated by the origin node and consists in selecting a new path and requesting the transit nodes along this path to reserve network resources for this specific connection.

Path Selection

The role of the Path Selection process is to determine optimum paths for users across the network each time a connection is requested. This implies the allocation of network resources to users in order to guarantee their quality-of-service requirements while optimizing the overall throughput within the network. This function takes place entirely within the origin node. Various quality of service parameters may be specified by the users, some of them in order to satisfy real-time delivery constraints, others related to non real-time data traffic transfer . . . . The origin node computes a path to the destination node that is capable of carrying the new connection and providing the level of service required by the new connection. The Path Selection algorithm uses data describing the current traffic load in the entire network (nodes and links). Such data are stored in a topology database located in each node of the network. If no suitable path can be found to meet all requirements, the connection is rejected. Once, the origin node has found a suitable path, a set up message is generated which traverses the selected route, updating the resource allocations for each link visited by the set up message. To meet high throughput, paths are selected and resources reserved once only at the time of the connection establishment. The Path Selection algorithm takes into account various constraints which comes both from the user (quality-of-service requirements, user's traffic characteristics) and from the current network topology and bandwidth allocation. In addition, the algorithm maximizes the network throughput by choosing a path with the least number of hops and which tends to achieve an even distribution of the traffic among the links. Once an appropriate path has been selected, the network connection establishment process takes place, and only then are the resources along the path reserved.

Non-Disruptive Path Switch Delay

In case of link failure, it is important to reroute the traffic on alternate paths without any disruption of the end user connections. However, selecting a path and setting up a connection can take considerable processing overhead in network nodes and can generate a significant delay. For end nodes supporting multiple connections set up requests simultaneously, it is easy to have some sort of scheduling to avoid bottlenecks in the connection set up process. But nevertheless, the time for establishing a connection may be huge. For permanent connections the set up delay probably does not have very much meaning. However, for connections service in real-time, this is a very important parameter, especially since some connections terminate in equipment that runs time-outs.

In general, the closer to the destination node the link is, the more the link carries connections towards this destination node. A failure on a link adjacent to an origin or destination node may involves the rerouting of a lot of connections and may lead to a high number of simultaneous new path set up. The establishment in parallel of multiple new connections through alternate routes takes time and may disrupt the connections at the end user level. The Non-Disruptive Path Switch mechanism assumes that:
1. first, the physical network has enough residual capacity to accommodate the network connections affected by the failure event, and
2. second, the path switching delay must be minimum in order to preserve the connections at the end user level.

Therefore, a very fast path switching must be implemented to avoid traffic disruption in some critical cases (typically when a great amount of real-time connections need to be immediately rerouted).

SUMMARY OF THE INVENTION

The present invention is directed to packet switching communication networks comprising a plurality of access and transit nodes interconnected with transmission trunks and in particular to a method and system for switching connections in a transparent manner to an alternate path in case of trunk failure.

More particularly, the object of the present invention is to provide a mechanism for locally rerouting, user traffic without disruption to an alternate path in cas of failure or unavailability of a trunk.
in each node, alternate paths between origin node and destination node of each outbound trunk are pre-computed according to existing user traffic, network resources, requested quality of service.
User traffic is pre-allocated on said one or plurality of alternate paths and resources are reserved.
In case of failure or unavailability of an outbound trunk:
said one or plurality of alternate paths are activated, and
the user traffic on said activated one or plurality of alternate paths is rerouted.

It is another object to reroute a large number of real-time connections simultaneously without disrupting end users connections.

BRIEF DESCRIPTION OF THE DRAWINGS

FIG. 4 shows the Alternate Path Database structure according to the present invention.

FIG. 5 describes the Topology Database structure.

FIG. 6 shows the link characteristics stored in the Topology Database.

DESCRIPTION OF THE PREFERRED EMBODIMENT

High Speed Communications

Figure 2:
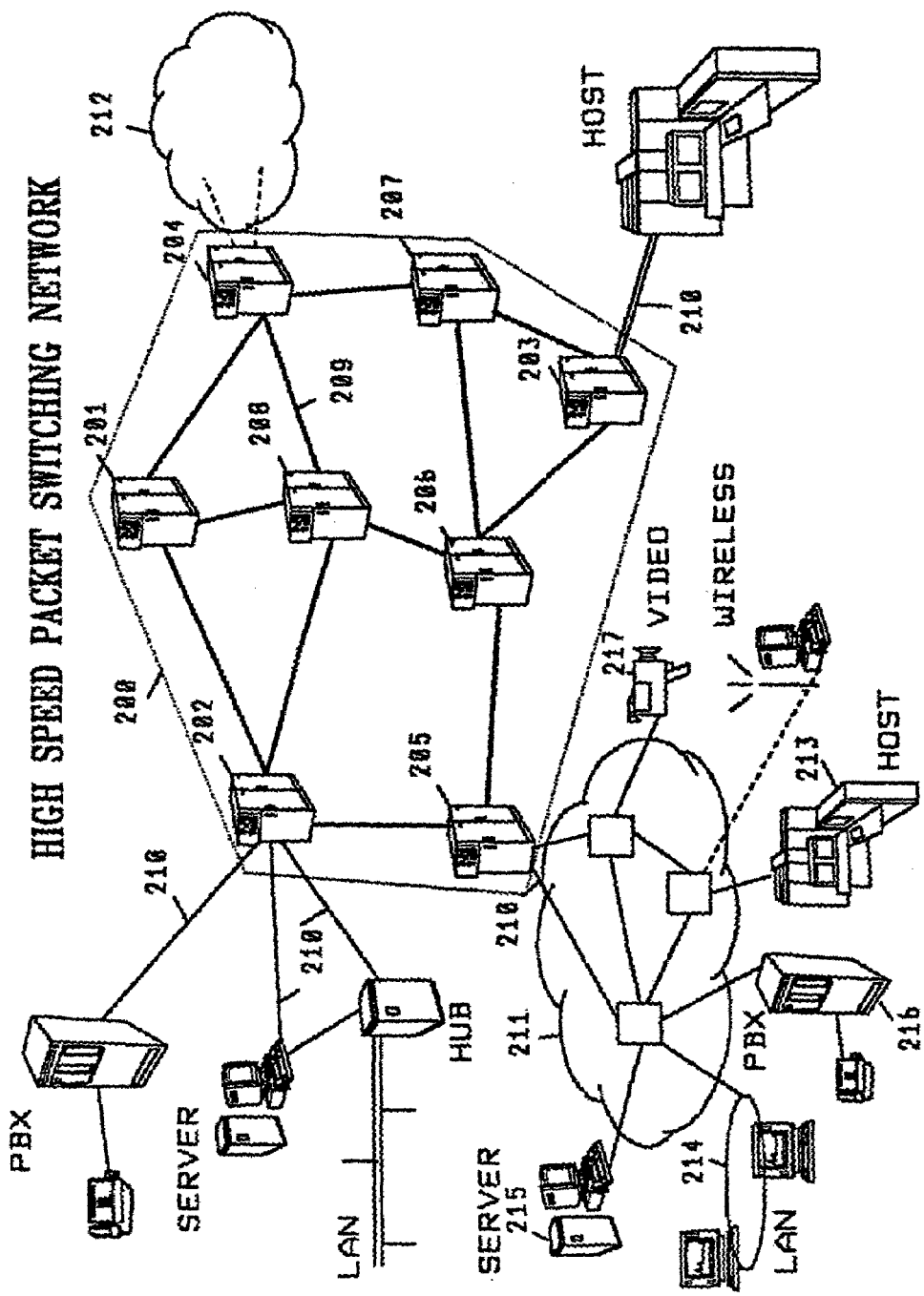
FIG. 2 shows a typical model of high speed packet switching network including the nodes claimed in the present invention.

As illustrated in FIG. 2, a typical model of communication system is made of several user networks (212) communicating through a high performance network (200) using private lines, carrier provided services, or public data networks. Each user network can be described as a set of communication processors and links (211) interconnecting large computers used as enterprise servers (213), user groups using workstations or personal computers attached on LAN (Local Area Networks 214), applications servers (215), PBX (Private Branch exchange 216) or video servers (217). These user networks, spread in different establishments, need to be interconnected through wide area transport facilities and different approaches can be used for organizing the data transfer. Some architectures involve the checking for data integrity at each network node, thus slowing down the transmission. Others are essentially looking for a high speed data transfer. To that end the transmission, routing and switching techniques within the nodes are optimized to process the flowing packets toward their final destination at the highest possibl rate. The present invention belongs essentially to the latter category and more particularly to the fast packet switching network architecture detailed in the following paragraphs.

High Performance Packet Switching Networks

The general view in FIG. 2 shows a fast packet switching transmission system comprising eight nodes (201 to 208) each node being interconnected by means of high speed communication lines called Trunks (209). The access (210) to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices. As example, the Access Node (202) interfaces respectively a Private Branch eXchange (PBX), an application server and a hub through three Ports and communicates through the network by means of the adjacent Transit Nodes (201), (205) and (208).

Switching Nodes

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes provide ancillary services such as:

the determination of routing paths for packets originated in the node, directory services like retrieving and updating information about network users and resources, the maintaining of a consistent view of the physical network topology, including link utilization information, and the reservation of resources at access points of the network.

According to the present invention, these ancillary services include:

the storage within the node of alternate paths, the updating of these paths.

Each Port is connected to a plurality of user processing equipment, each user equipment comprising either a source of digital data to be transmitted to another user system, or a data sink for consuming digital data received from another user system, or, typically, both. The interpretation of the users protocols, the translation of the users data into packets formatted appropriately for their transmission on the packet network (200) and the generation of a header to route these packets are executed by an Access Agent running in the Port. This header is made of Control, Routing and Redundancy Check Fields.

The Routing Fields contain all the information necessary to route the packet through the network (200) to the destination node to which it is addressed. These fields can take several formats depending on the routing mode specified (connection oriented or connectionless routing mode . . . ).

The Control Fields include, among other things, an encoded identification of the protocol to be used for interpreting the Routing Fields.

The Redundancy Check Fields are used to check for errors in the header itself. If an error is detected, the packet is discarded.

Routing Points

Figure 3:
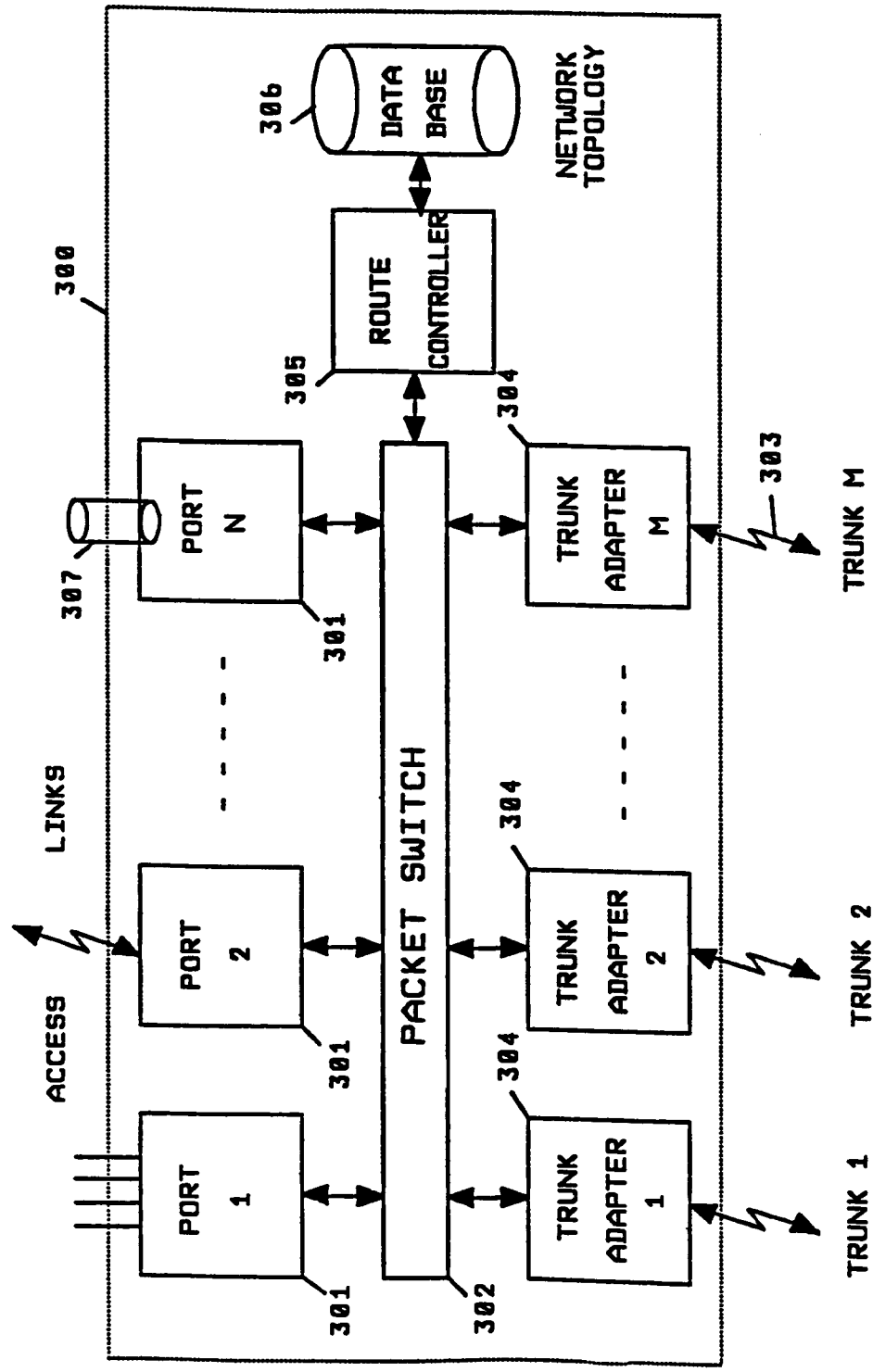
FIG. 3 describes a high speed Routing Point according to the present invention.

FIG. 3 shows a general block diagram of a typical Routing Point (300) such as it can be found in the network nodes (201 to 208) illustrated in FIG. 2. A Routing Point comprises a high speed packet Switch (302) onto which packets arriving at the Routing Point are entered. Such packets are received:

from other nodes over high speed transmission links (303) via Trunk Adapters (304).

from users via application adapters called Ports (301).

Using information in the packet header, the adapters (304, 301) determine which packets are to be routed by means of the Switch (302) towards a local user network (307) or towards a transmission link (303) leaving the node. The adapters (301 and 304) include queuing circuits for queuing packets prior to or subsequent to their launch on the Switch (302).

The Route Controller (305) calculates the optimum paths through the network (200) so as to satisfy a given set of quality-of-services specified by the user and to minimize the amount of network resources used to complete the communication path. Then, it builds the header of the packets generated in the Routing Point. The optimization criterion includes the number of intermediates nodes, the characteristics of the connection request, the capabilities and the utilisation of the links (Trunks) in the path, the number of intermediate nodes . . . . The optimum route is stored in a Routing Database (308) for further reuse.

All the information necessary for the routing, about the nodes and transmission links connected to the nodes, are contained in a Network Topology Database (306). Under steady state condition, every Routing Point has the same view of the network. The network topology information is updated when new links are activated, new nodes added to the network, when links or nodes are dropped or when link loads change significantly. Such information is exchanged by means of control messages with all other Route Controllers to provide the up-to-date topological information needed for path selection (such database updates are carried on packets very similar to the data packets exchanged between end users of the network). The fact that the network topology is kept current in every node through continuous updates allows dynamic network reconfigurations without disrupting end users logical connections (sessions).

The incoming transmission links to the packet Routing Point may comprise links from external devices in the local user networks (210) or links (Trunks) from adjacent network nodes (209). In any case, the Routing Point operates in the same manner to receive each data packet and forward it on to another Routing Point is dictated by the information in the packet header. The fast packet switching network operates to enable a communication between any two end user applications without dedicating any transmission or node facilities to that communication path except for the duration of a single packet. In this way, the utilisation of the communication facilities of the packet network is optimized to carry significantly more traffic than would be possible with dedicated transmission links for each communication path.

Network Management

Network Control Functions

The Network Control Functions are those that control, allocate, and manage the resources of the physical network. Each Routing Point has a set of the foregoing functions in the Route Controller (305) and uses it to facilitate the establishment and the maintenance of the connections between users applications. The Network Control Functions include in particular:

Directory Services for retrieving and maintaining information about network users and resources.

Bandwidth Management for processing the bandwidth reservation and maintenance messages, and for monitoring the current reservation levels on links.

Path Selection for choosing the best path for each new connection considering the connection requirements and the current link utilisation levels.

Control Spanning Tree for establishing and maintaining a routing tree among the network nodes, for using it to distribute control information (in parallel) including link utilisation, and for updating the Topology Database of the nodes with new network configurations or link/node failures.

Topology Update for distributing and maintaining, using the Spanning Tree, information about the logical and physical network (including link utilization information) in every node.

Congestion Control
  for enforcing the bandwidth reservation agreements between the network's users and the network which are established at the call set up time, and
  for estimating actual bandwidth and for adjusting reservation if necessary during the life of the connection.

Topology Database (TDB)

The Topology Database contains information about nodes, links, their properties, and the bandwidth allocation. The topology information is replicated in each node of the network. An algorithm guarantees the correctness of each node's Topology Database when links and nodes are added or deleted or when their characteristics change. The database comprises:

the physical topology of the network which includes static information like physical characteristics of nodes and links, the state of nodes and links, and the link utilisation which includes dynamic characteristics like current bandwidth (used and reserved), real-time measurements . . .

The general organisation of the Topology Database is shown in FIG. 5. To each resource in the network, nodes (501) or links (502), is associated an entry in the database. In particular, each link entry includes the following characteristics:

(503) the link physical properties:
  transmission medium and speed,
  routing mode supported,
  maximum packet size,
  link buffer capacity,
  propagation delay,
  bandwidth reservation supported . . .

(504) the link state:
  on-line (link can accept user connections),
  quiesce (link cannot accept additional user connections, but existing connections continue),
  off-line (link cannot accept user connections and existing connections are cancelled) . . .

(505) the link utilization:
  real-time measurements,
  reserved bandwidth, . . .

FIG. 6 shows in a table, some of the information stored in the Topology Database. Though all characteristics of the links are listed in each node, in the present application only a few will be described:

Total Capacity (bps) C

The Topology Database contains, for each link, its Total Capacity. The value $C_{ij}$ represents the total bandwidth available on the link between nodes i and j.

Reservable Fraction (%) rf

As might be expected, one of the critical characteristics of transmission links is the fraction of the link capacity effectively available. Links cannot be loaded up to a theoretical maximum load (bandwidth) for two reasons:

first, to set aside bandwidth for network control functions, and
  secondly, to keep the loss probabilities and queueing delays low in the case of short term bandwidth violations by the different traffic sources.

The reservable fraction of a link rf is the effective percentage of the Total Capacity $C_{ij}$ that can be reserved on the link between nodes i and j to maintain a reasonable quality of transmission. If $C_{ij}$ is the Total Capacity of the link, then $R_{ij}=rf \times C_{ij}$ is the Reservable Capacity of this link ($C_{ij} \leq R_{ij} \leq C_{ij}$).

Note: For most network architectures, no more than 85% of the total bandwidth of a link $C_{ij}$ can be explicitly reserved for user traffic (rf<0.85).

Total Reserved Equivalent Capacity (bps) $\hat{C}_{R,ij}$

For a connection k on a link between nodes i and j, the simplest way to provide low/no packet loss would be to reserve the entire bandwidth requested by the user. However, for bursty user traffic, this approach can waste a significant amount of bandwidth across the network. To save resources, the bandwidth amount actually reserved is equal to an "Equivalent Capacity" $\hat{c}_{k,ij}$, said Equivalent Capacity being a function of the source characteristics and of the network status. The bandwidth reservation falls somewhere between the average bandwidth required by the user and the maximum capacity of the connection. The value $$\hat{C}_{R,ij} = \hat{C}_{R,ij}^K = \sum_{k=1}^{K} \hat{C}_{k,ij} = \text{sum}$$

of the reserved Equivalent Capacities represents the total bandwidth reserved on the link between nodes i and j by K connections already established. If the difference between this already reserved link Equivalent Capacity $\hat{C}_{R,ij}$ and the Total Reservable Capacity of the link $rf \times C_{ij}$ is less than the bandwidth requested by a new reserved connection then the link cannot be selected. However, the link may be selected for a non-reserved connection where no explicit bandwidth reservation is needed.

Total Bandwidth used by Non-Reserved Traffic (bps) $M_{NR,ij}$

The value $M_{NR,ij}$ represents the total load or bandwidth currently used by non-reserved traffic as measured on the link between nodes i and j.

Total Capacity Used (bps) $\hat{C}_{T,ij}$

The Total Bandwidth Used $\hat{C}_{T,ij}$ on the link between node i and node j is computed by adding the total reserved bandwidth $\hat{C}_{R,ij}$ and the measured bandwidth $M_{NR,ij}$ used by non-reserved traffic.

Maximum Packet Size (bytes) $mps_{ij}$ $mps_{ij}$ is defined as the maximum packet size supported by the link between nodes i and j.

Bandwidth Management

Users are requiring different quality-of-services. In order to provide the various service levels, different types of network connections are established. A connection is defined as a path in the network between the origin access node and the destination access node representing respectively the source user and the target user. Networks connections can be classified as reserved or non-reserved. Reserved network connections require bandwidth to be allocated in advance along the chosen path.

Most of the high speed connections are established on a reserved path to guarantee the quality of service and the bandwidth requested by the user. This path across the network is computed by the origin node using information in its Topology Database including current link utilization. The origin node then sends a reservation request along the chosen path, and intermediate nodes (if allowing the reservation) then add this additionally reserved capacity to their total. These changes are reflected in topology broadcast updates sent by the intermediate nodes. Intermediate nodes need not to have an awareness of the status of each connection on their adjacent links. If an intermediate node does get too many packets, generally because of unanticipated burstiness, it simply discards them (the user can select a service that will recover from such discards).

Depending on the node type, the function of the Bandwidth Management is:
in the origin node,
- to identify the best possible route according to the network status and the connection parameters including the connection priority,
- to reserve at connection setup, the bandwidth required by the network connections and to maintain this bandwidth for the duration of the connection.
- to reject the connection if resources needed to satisfy the request are not available in the network.

in a transit node,
- to administer the bandwidth reservations on the links, and according to the present invention to administer the bandwidth reservations on the links of the alternate paths.

Bandwidth Reservation

Figure 1:
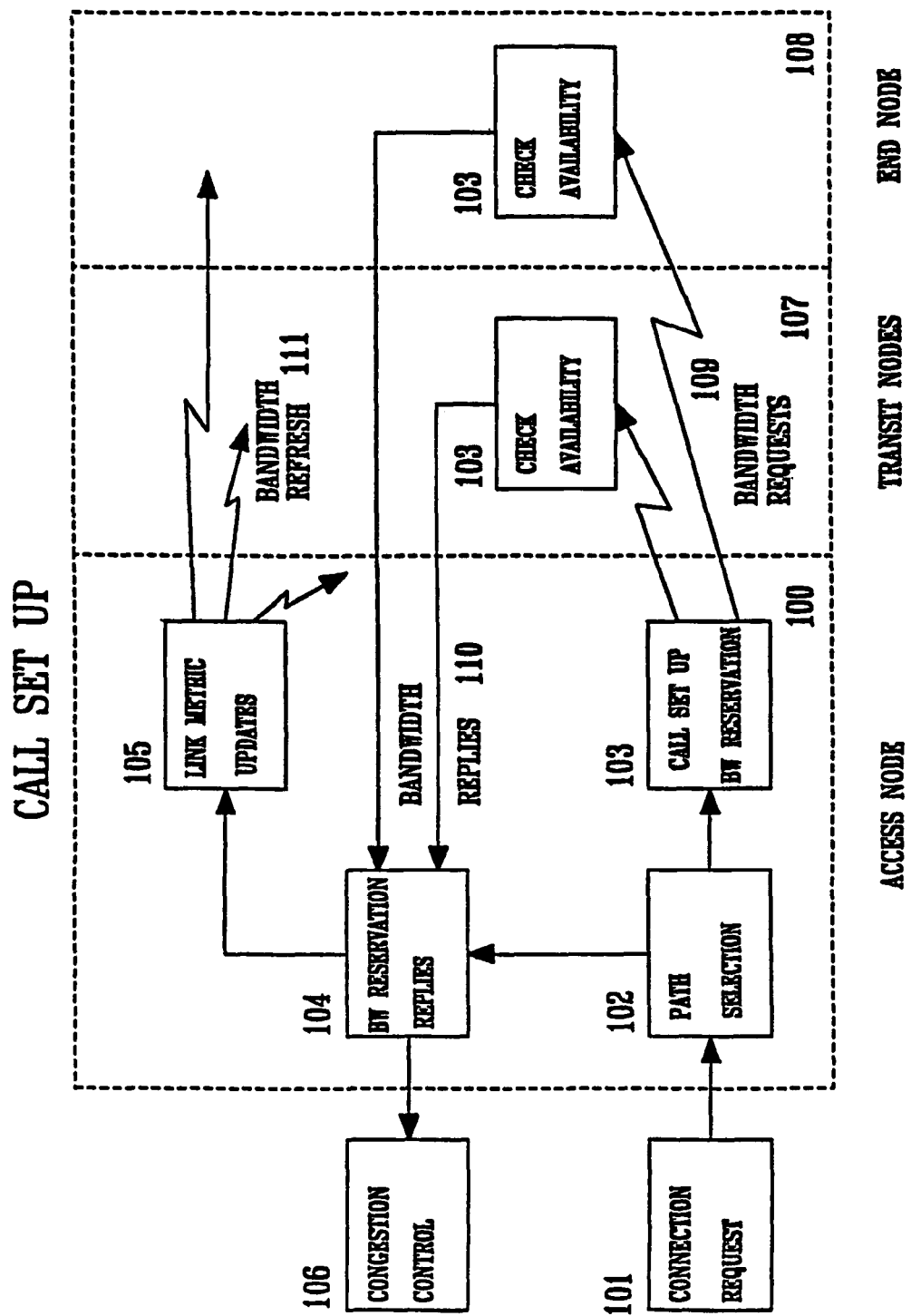
FIG. 1 describes the bandwidth reservation process.

The connection set up and bandwidth reservation process, as shown in FIG. 1, comprises the following steps:
(101) a Connection Request is specified by the user via a set of parameters including origin and destination network address, and data flow characteristics (bit rate, burstiness).
(102) a Path Selection process determines a path and a set of connection requests, one for each link of the path, using parameters provided by the Topology Database.
(103) a Bandwidth Reservation process uses the connection requests to reserve bandwidth on each of the links of the path. This process involves exchange of information (109) between the origin (access) node (100), the transit nodes (107) on the path, and the destination node (108).
(104) Bandwidth Reservation replies from transit nodes and end node generate either a call acceptance or a call reject (110).
(105) a Link Metric Update process updates, in case of call acceptance, the modified link metrics. This information (111) is sent through the Control Spanning Tree to the Topology Database of each node in the network by means of a broadcast algorithm.
(106) a Congestion Control Set Up adjusts, if the call is accepted, the network connection characteristics.

The bandwidth reservation process is performed in the origin and destination nodes by Connection Agents (CA) and by Transit Connection Managers (TCMs) in the transit nodes along the chosen path.

Path Selection

The purpose of the Path Selection process is to determine the best way to allocate network resources to connections both to guarantee that user quality of service requirements are satisfied and also to optimize the overall throughput of the network. The Path Selection process must supply to the requesting user a path over the network over which a point-to-point connection will be established, and some bandwidth will be reserved if needed. The Path Selection algorithm uses as input parameters in one hand the user requirements and on the other hand the status of the network links and nodes as maintained in the Topology Database.

The Path Selection process takes place entirely within the node wherein the connection is requested. It makes use of the Topology Database and selects the "best path" based on each of the following criteria in order of importance:

Quality-of-Service:
The connection's quality-of-service requirements are to be satisfied throughout the life of the connection. There are a large number of variables that determine the performance of a network. However, the quality-of-service can be defined as the set of measurable quantities that describe the user's perception of the service offered by the network. Some of the quality-of service parameters are listed below:
connection set up delay,
connection blocking probability,
loss probability,
error probability,
end-to-end transit delay,
end-to-end delay variation,
. . .

Some of these quantities have an effect upon how paths are computed, for example the packet loss probability or the end-to-end transit delay: the sum of propagation delays along a computed path may not violate the end-to-end transit delay specifications.

Minimum Hop:
The path shall consist of as few links as feasible to support the connection's quality of service requirements, thus minimizing the amount of network resources as well as processing costs to support the connection. The path computation is based on the links utilization at the time the connection is requested.

Load Balancing:
Among a minimum hop path, a path with "lightly loaded" links is preferred over a path with "more heavily loaded" links based on the network conditions at the time of path selection. The load of a link depend of the customer criteria: it can be an increasing function of the total reserved bandwidth of the link, proportional to the amount of traffic actually measured on the link, . . . When the path load (sum of the load of the links over the selected path) is the preponderant criterion of selection, the path of lesser load is chosen.

Satisfying the first requirement is the key factor in path selection and the other two functions are used to optimize traffic through the network.

Fast Non-Disruptive Path Switching

Alternate Paths

Figure 7:
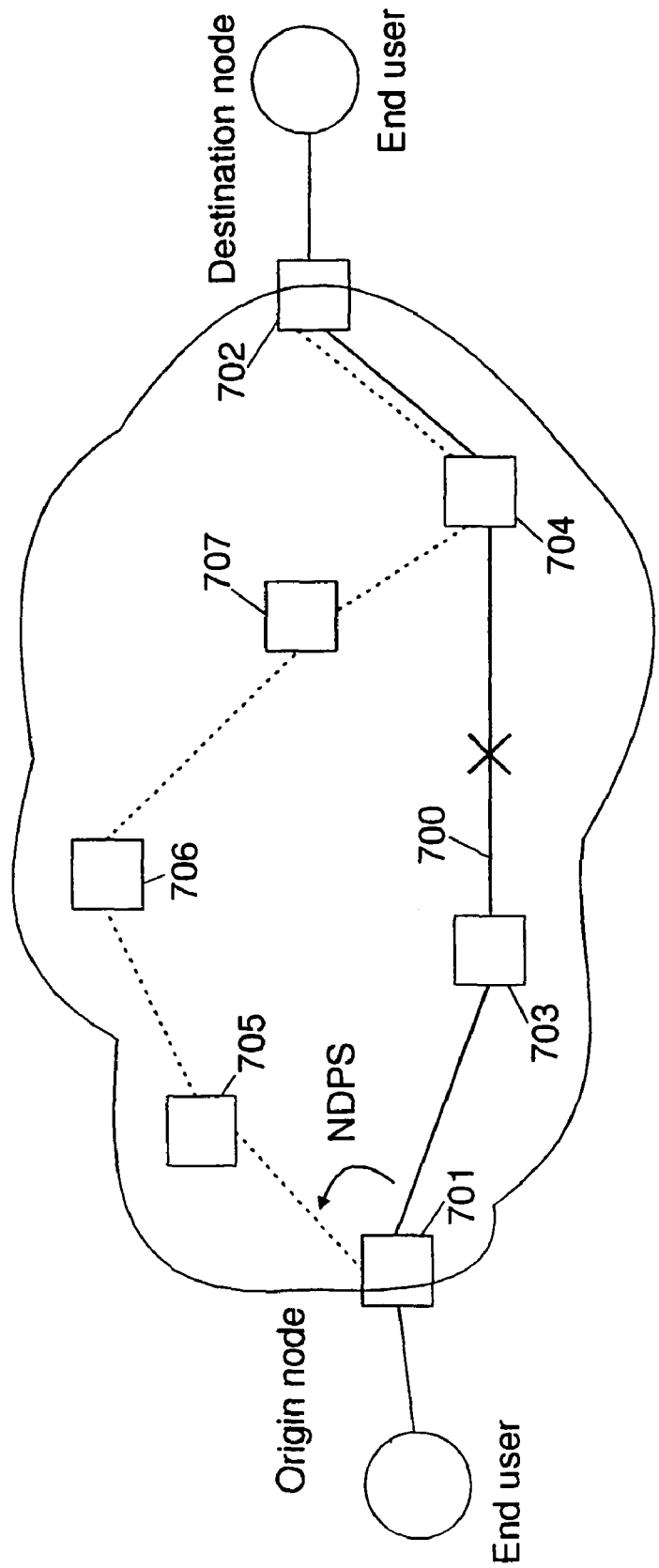
FIG. 7 is a general view of the Non-Disruptive Path Switch (NDPS) process according to prior art.

According to the prior art described in FIG. 7, when a link (trunk) (700) between two nodes (703, 704) is in failure, the Non-Disruptive Path Switch, applied at connection level consists in taking down the existing path and performing a new path set up. The process is initiated by the origin (access) node (701) and consists in selecting a new path (from the origin (701) to the destination node (702)) and requesting the transit nodes (705, 706, 707, 704) along this path to reserve network resources for this specific connection.

Figure 8:
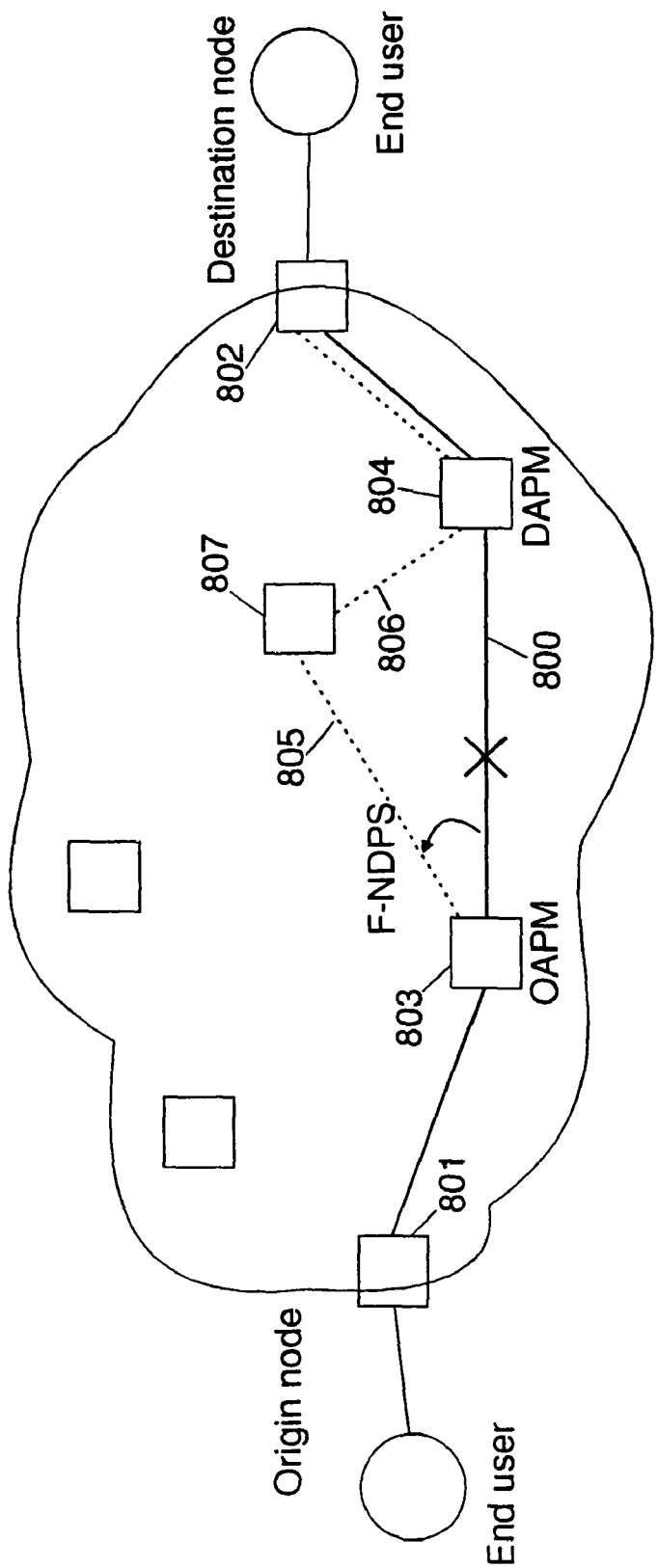
FIG. 8 is a general view of the Fast Non-Disruptive Path Switch (F-NDPS) process according to the present invention.

The object of the present invention as shown in FIG. 8, is to provide a mechanism for locally bypassing a link (trunk) in failure (800) by alternate pre-computed paths. An alternate path (links 805, 806, transit node 807) between two adjacent nodes (803) and (804) is a path which avoids the link (800) between said two nodes. In general, there are several alternate pre-computed paths on which connections can be rerouted in case of link failure.

The alternate paths comprise a limited number of hops (one or two in the preferred embodiment).

The origin node (801) owning the connection and the destination node (802) are not involved in the alternate path switching mechanism.

The alternate paths are pre-computed for each existing link in each transit node.

The alternate paths are periodically updated to take into account the bandwidth changes or the links availability changes inside the network. The lists of the connections which are rerouted on the alternate paths, are also updated. The rerouting of connections over pre-computed alternate paths is under the control of the transit node (803) in charge of the link in failure (800).

The Fast Non-Disruptive Path Switching (F-NDPS) system and method according to the present application can be used jointly with the existing end-to-end NDPS processes as described in FIG. 7. In view of its very short response time, the Fast NDPS must be considered as a complementary mechanism for rerouting large number of real-time connections simultaneously without disrupting end users connections.

Transit Nodes

Trunk adapters comprise Transit Connection Managers (TCM) for controlling and managing the trunks emanating from the transit node. A Transit Connection Manager (TCM) monitors the bandwidth reservation of a trunk, and updates them whenever a network connection with reserved bandwidth is established or taken down. The TCM keeps this information in a table known as the Connection Table (CT) with an entry for each network connection with reserved bandwidth.

The TCM also keeps aggregate values for bandwidth reservation levels for each delay priority of the real-time and non real-time types of traffic. These aggregate values are the totals taken from each of the network connection entries in the table, and are known as the link metrics.

TCMs in a node are responsible for informing the topology services about the link metric information. The TCMs signal this information to topology services when a significant change in a link's bandwidth reservation occurs, and topology services then send a topology database update to all nodes in the network.

The TCMs are also responsible for controlling the allocation of labels for the label-based transfer nodes (label swapping and ATM).

Figure 9:
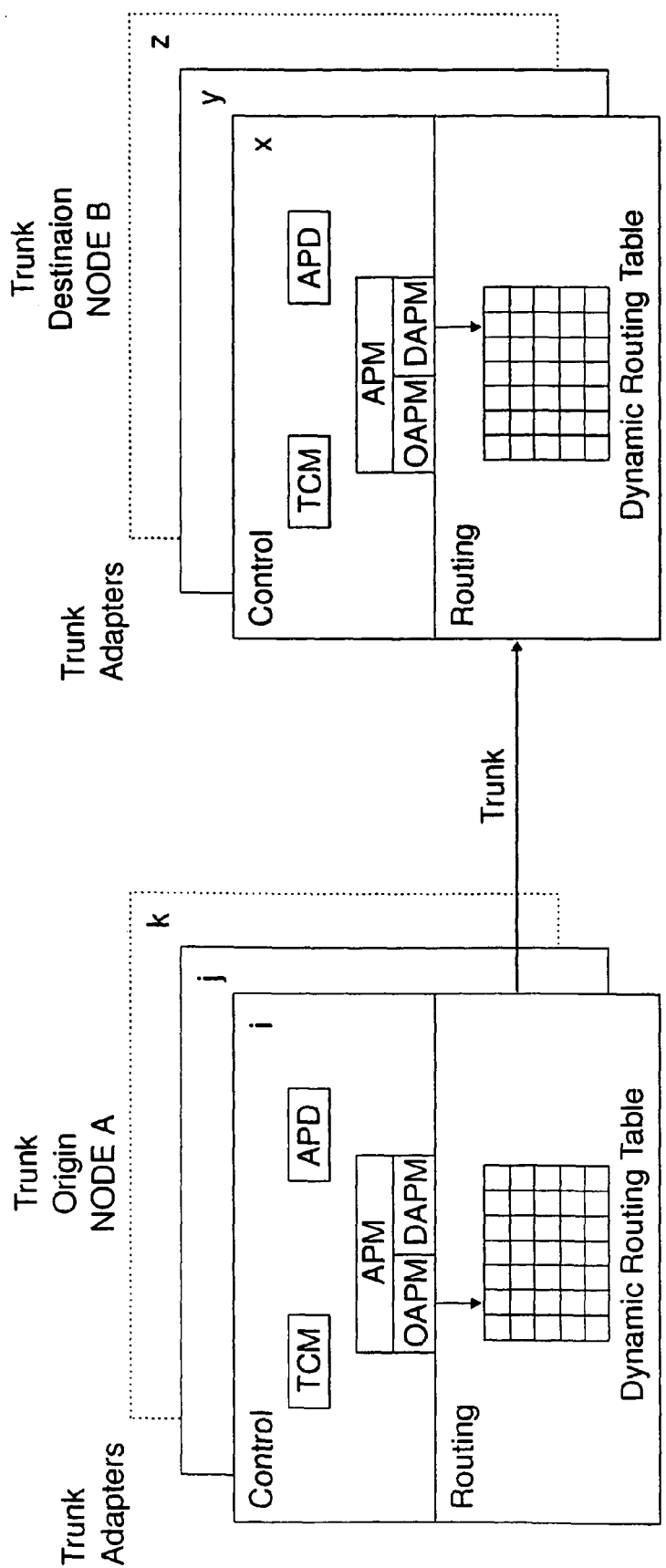
FIG. 9 is a functional view of a trunk adapters according to the present invention.

As shown in FIG. 9, in addition to the Transit Connection Manager (TCM), trunk addapters comprise two additional components per trunk: an Alternate Path Manager (APM) and an Alternate Path Database (APD).

The Alternate Path Manager (APM) selects and updates alternate paths corresponding to each link (trunk) with the help of the Path Selection function (as the Connection Agent of the origin and destination (access) nodes do at call setup). These alternate paths are stored in a database called Alternate Path Database (APD).

The Alternate Path Database (APD) comprises the alternate paths corresponding to each link (trunk) managed by the trunk adapter. There is only one Alternate Path Database per trunk adapter.

Alternate Path Database Structure

The Alternate Path Database (400) as shown in FIG. 4 is organized in two tables:

a Path Table (410) for recording the alternate paths, and a Link Table (420) for recording the links related to said alternate paths stored in said Path Table. (410).

The Alternate Path Database (APD) further comprises:

a Time-to-Live parameter (430) used for riding the whole database of outdated information. The Time-to-Live is decremented once every fixed period of time (once every hour for instance). In a preferred embodiment, when the Time-to-live is equal to zero, the database is considered as outdated and a new database is set up. Another option is to update only paths which show an important bandwidth or availability change.

Assuming that a communication adapter (304) does not handle more than 8 links (303), and that the alternate paths do not exceed two hops, the number of entries of both Path Table and Link Table remains limited (less than 100 in preferred embodiments). Consequently, no special implementation of said tables is required to maintain an acceptable access time. Nevertheless, in the case of these assumptions would not be true (more than 8 links and 2 hops), Path and Link Table can be organized as hash tables with direct chaining in an overflow area as described in publication entitled "Algorithms+Data Structures=Programs" from Niklaus Wirth (pages 264 to 274, Prentice-Hall Inc).

Path Table

In the present application, only some of the parameters stored in the Path Table (410) will be described. Each entry represents an alternate path:

Parent Link (416)

Identification of the outbound link which will be bypassed by the alternate path in case of failure.

Destination Node (412)

Identification of the destination node of the link to bypass.

Link List (411)

List of the links along the alternate path (path which goes from the current node to the node destination of the link to bypass).

Path Characteristics (413)

Maximum Packet Size: minimum of the maximum packet sizes supported by all links on the path calculated for each of the different delay priorities (real-time, non real-time, non reserved delay priorities).

Maximum delay: sum of the transfer delay of each link on the path calculated for each of the different delay priorities (circuit emulation real-time, non real-time, delay priorities).

Maximum delay variation (Jitter): sum of maximum delay variation of each links on the path calculated for each of the different delay priorities (real-time, non real-time, delay priorities).

Loss probability: sum of loss probabilities of all links in the path calculated for each of the different delay priorities (real-time, non real-time, best effort delay priorities). The loss probability may be estimated by the ratio (lost information)/(total information transferred). The lost information is information sent by the origin node that never arrives at the intended destination due to network conditions (congestion, traffic policing, errors . . . ).

Hop count: number of links in the alternate path. The path is computed with the Path Selection function with, in a preferred embodiment, a constraint of two hops maximum.

Bandwidth Reservation (414):

Total Capacity Used for each link along the alternate path p $\hat{C}_{T,ij}$:

Total bandwidth used on the link between node i and node j with link i,j on the alternate path p.

Remaining Available Capacity along the alternate path P $\hat{C}_{A,p} = \min\{C_{ij} - \hat{C}_{T,ij}\}$:

Minimum bandwidth unused on the alternate path. The amount of available bandwidth is equal to the smaller difference among all the ij links along the alternate path, between the link capacity $C_{ij}$ and the Total Capacity Used $\hat{C}_{T,ij}$.

List of Rerouted Connections (415): list of the connections which will be rerouted on this alternate path in case of failure on the link.

Link Table

In the present application, only some of the parameters stored in the Link Table (420) will be described. Each entry of the Link Table represents a link $l_{ij}$ between a node i and a node j and used in one or a plurality of alternate paths.

Link Identifier in the Topology Database (422):

The Link Identifier (for example the link address in the Topology Database) is a means for having a direct access to the link characteristics (physical properties, state, utilization) stored in the Topology Database (TDB) (502). This Link Identifier creates a link between the Topology Database (TDB) which is periodically updated, and the Alternate Path Database (APD).

Link Characteristics (423):

Total Capacity (bps) C
Reservable Fraction (%) rf
Total Reserved Equivalent Capacity (bps) $\hat{C}_{R,ij}$
Total Bandwidth used by Non Reserved Traffic (bps) $M_{NR,ij}$
Total Capacity Used (bps) $\hat{C}_{T,ij}$
Maximum Packet Size (bytes) $mps_{ij}$ Parent Path (424):

Identification of the alternate path associated with the outbound link and stored in the Path Table (for example the address in the Path Table of the Parent Path).

Alternate Path Manager (APM)

In communication adapters, for each outbound link (trunk) a new component called Alternate Paths Manager (APM), is in charge of permanently maintaining alternate paths. The Alternate Path Manager (APM) is responsible for:
selecting alternate paths,
monitoring alternate paths,
activating alternate paths.

The Alternate Path Manager (APM) can be compared to a Connection Agent (CA) since it determines a path and reserve resources along said path. As for the Connection Agent (CA), the Alternate Path Manager (APM) can take two roles: it can act as an Origin Alternate Path Manager (OAPM, 803) or as a Destination Alternate Path Manager (DAPM, 804).

The Origin Alternate Path Manager (OAPM), as shown in FIG. 9 is triggered by the Transit Connection Manager (TCM) and is responsible for seting up, maintaining and monitoring the alternate paths of the trunk managed by this TCM. In addition, the OAPM updates the Alternate Path Database (APD) in the adapter.

The Destination Alternate Path Manager (BAPM) mainly updates local routing tables and responds to the requests of the Origin Alternate Path Manager (OAPM).

Each time a new connection requiring Non-Disruptive Path Switching (NDPS) is set up, the Transit Connection Manager (TCM) triggers the Origin Alternate Path Manager (OAPM) to include the new connection in the List of Rerouted Connections (415). The Fast Non-Disruptive Path Switching (F-NDPS) is "local" and specific for each trunk which means that it is not based on an end-to-end process as the connection set up and the bandwidth reservation. For a given connection established on a three hops path, three different F-NDPS sub-processes are triggered (one for trunk 1, trunk 2 and trunk 3 along the path).

Alternate Path Selection

In a preferred embodiment, the Origin Alternate Path Manager (OAPM) uses the Rapid Transport Protocol (RTP) connection available between the Transit Connection manager (TCM) in the trunk adapter (304) and the Path Selection function in the Route Controller (305). The Alternate Path Selection process is identical to the Path Selection process used by the origin (access) node (701) during the connection set up. However, there are some limitations, the number of hops for example. The Alternate Path Selection process integrates some of the following parameters:
unidirectional path,
maximum number of hops: 2,
minimum weight,
least loaded path, . . .

Alternate Path Manager (APM) Procedures

Figure 11:
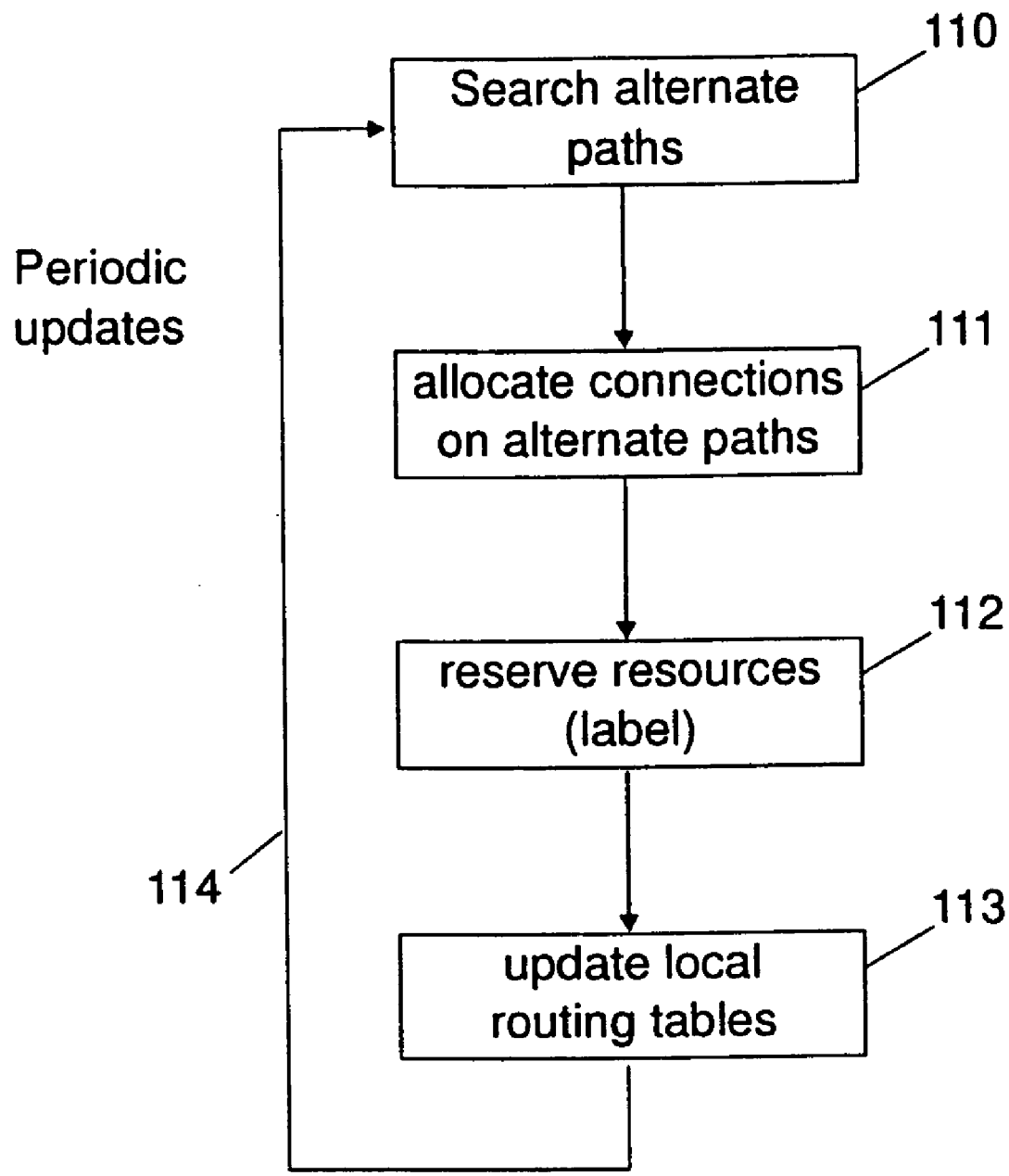
FIG. 11 shows a general flow chart of the Alternate Path Manager (APM) tasks according to the present invention.

As shown in FIG. 11, the object of the Alternate Path Manager (APM) is:
(110) to search and select alternate paths,
(111) to allocate connections to said alternate paths depending on the quality-of-service requirements of said connections,
(112) to reserve resources (labels) on the alternate paths,
(113) to update the routing tables at the time the alternate path is activated.
(114) to update the alternates paths and the allocation of the connections according to the variations of the bandwidth utilization and link status.

More particularly, each Alternate Path Manager (APM) is responsible for:
determining alternate paths for the outbound link (trunk) it manages.
storing in the Alternate Path database (APD) said alternate paths.
optimally allocating the connections on said alternate paths.
modifying the allocation of the connections on alternate paths when an update message concerning the utilization or the status of a link along the alternate path is received from the Topology Database (TDB).
informing the local Transit Connection Manager (TCM) of these modifications.
triggering, when an alternate path has been found for a connection, the local Transit Connection Manager (TCM) for setting up said connection and updating the routing tables along the alternate path (labels reservation).
requesting to the Transit Connection Manager (TCM) the immediate rerouting of the traffic in case of link failure.

This process is done periodically. The period duration is specified by means of the "Time-to-Live" parameter (430). When the time period expires, the Alternate Path Database (APD) is flushed and a new alternate path is searched for each connection.

Alternate Path Database Fill-Up Procedure

Figure 12:
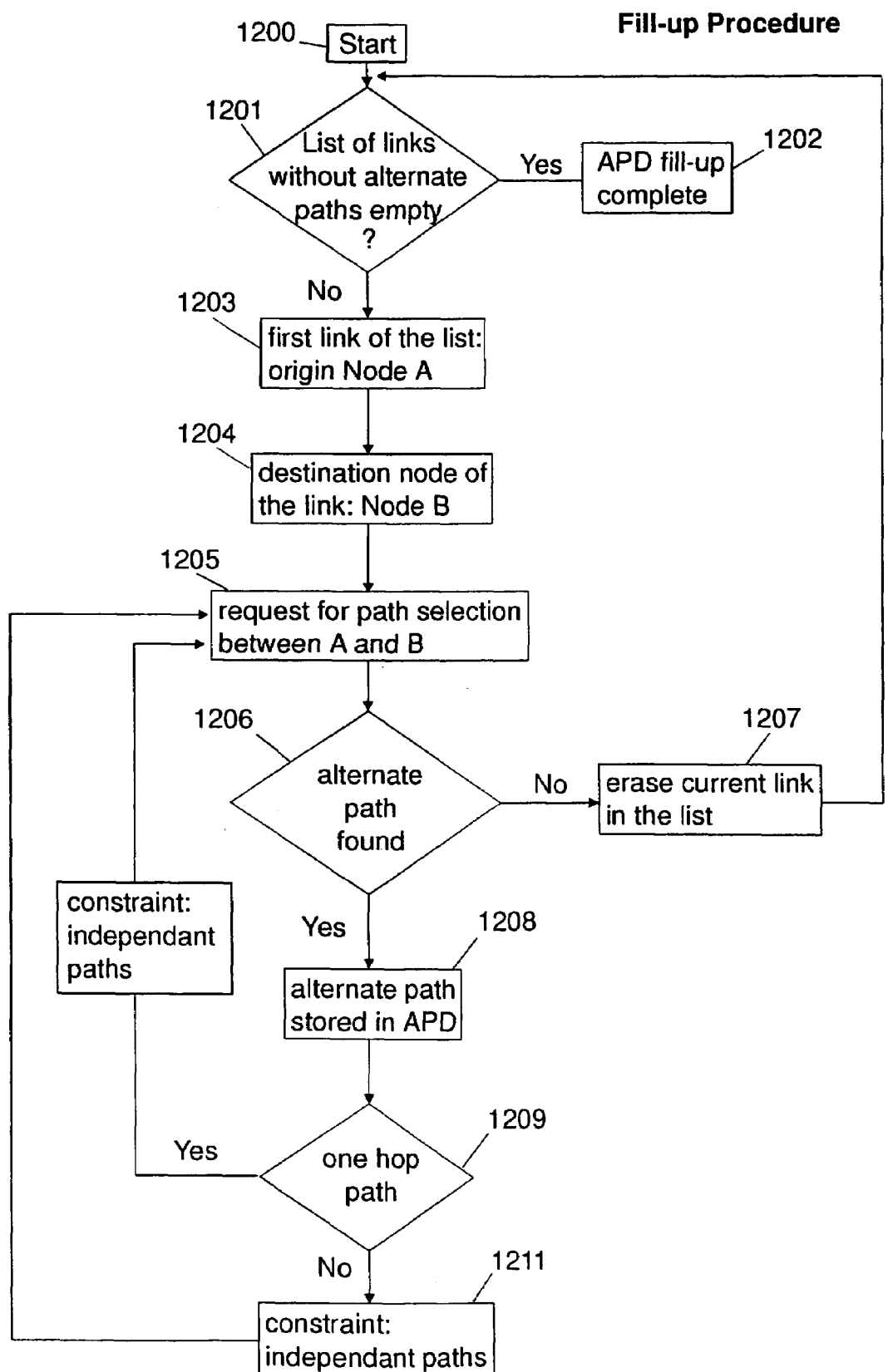
FIG. 12 shows a detailed flow chart of the Alternate Paths Database Fill-up procedure according to the present invention.

The Alternate Path Fill-up procedure is intended to collect all the alternate paths bypassing the links handled by the local Transit Connection Manager (TCM) with a predetermined number of hops (maximum 2 hops in a preferred embodiment). One of the specificity of this procedure, is that, for each outbound link to back-up, when a link has been used in a alternate path it cannot be used once again for another alternate path to guarantee the independence of the paths. This approach has been chosen to make the traffic allocation much more simple since the bandwidth to redistribute in case of link failure is equal to the sum of the remaining available bandwidth provided by the different alternate paths. FIG. 12 shows a general flow chart of this procedure called either during the initialization of the Alternate Path Database (APD) or when the Time-to-Live of the database has expired.

(1200): Start of the procedure (1201): A test determines whether the list of the outbound links to back-up is empty or not:

(1202): If the list is empty, there is no more link to back-up and the Alternate Path Database Fill-up procedure is complete.

(1203): If the list is not empty, the first link of the list (called "origin link") is selected. The origin node of this link is the current node (node A).

(1204): The Destination Node Identifier (node B) is retrieved from the link record in the Topology Database (TDB).

(1205): An alternate path request (equivalent to any path selection request) using this Destination Node Identifier is sent to the Path Selection function, located in the Route Controller of the node. The path selection process determines a path from the origin node of the link to bypass (local node) to the destination node identified in previous step (1204). The maximum number of hops allowed is specified (2 hops maximum in a preferred embodiment). No other constraints are specified in the request.

(1206): When the response from the Path Selection function is received, a test determines whether a path has been found or not:

(1207): If no path has been found: the link is removed from the list of the links to back-up and the procedure restarts at test (1201) described above.

(1208): If a path has been found: the path is stored into the Alternate Path Database (APD) and the procedure goes on with step (1209).

(1209): A test determines whether or not the path which has been stored is a one hop path.

If the path stored is a one hop path, a new request is sent to the Path Selection function to determine whether another one hop alternate path independent from the previous one exists or not (1205).

If the path stored is not a one hop path, the procedure goes on with step (1211).

(1211): If the path stored is a two hops path (no one hop exists), a new request is sent to the Path Selection function (1205) to determine whether another two hops alternate path passing thru the same transit node and not using the links already used in the previously computed alternate paths exists or not. Another two hops alternate path, independent from the previous ones (1211), would improve the reliability and load balancing of the alternate path process.

(1208) If an independent two hop path is found: the path is stored in the Alternate Path Database (APD).

(1207): If no more path is found: the link is removed from the list of the links to back-up and the procedure is restarted at test (1201) described above.

Connection Traffic Initial Allocation Procedure

Figure 13:
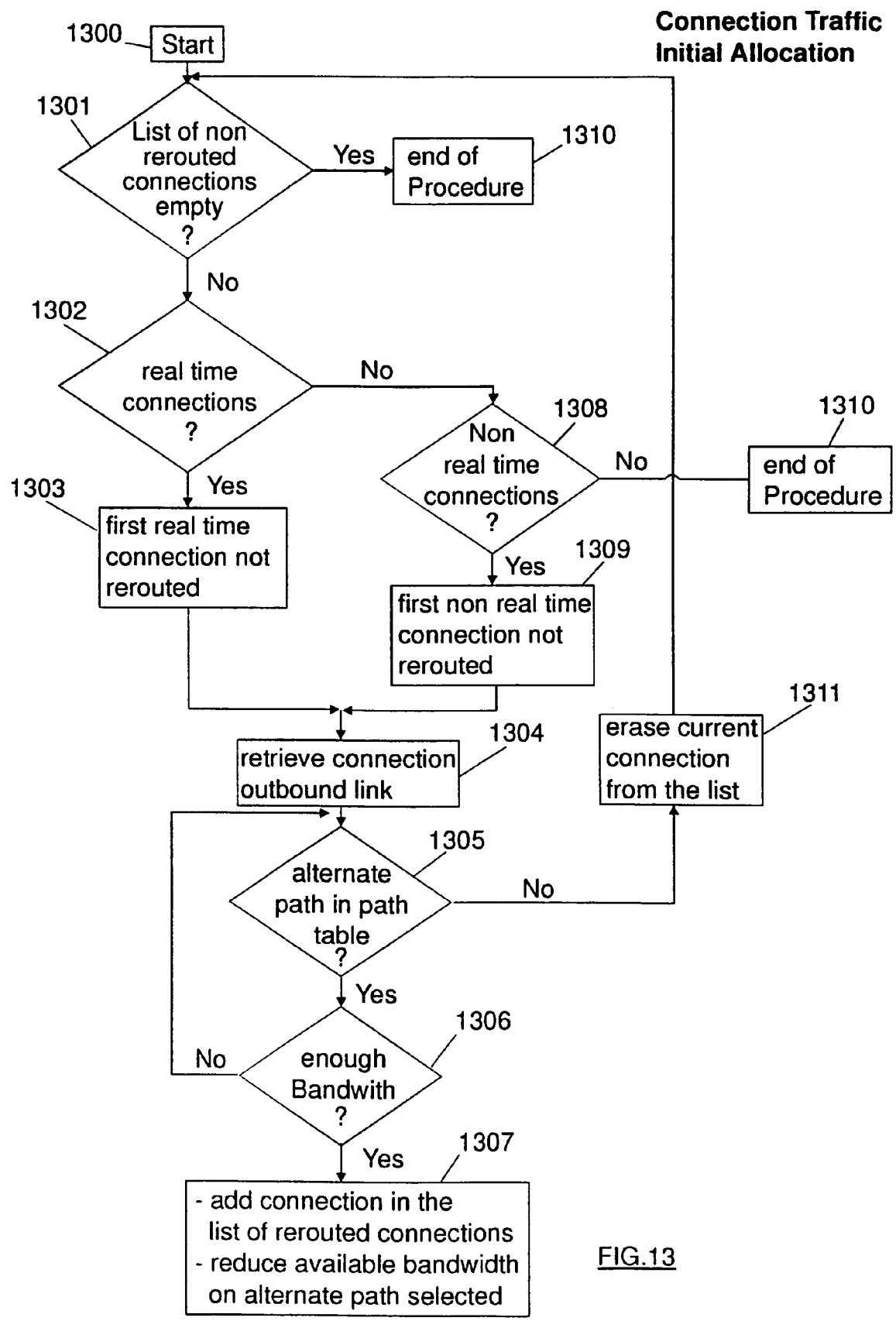
FIG. 13 shows a detailed flow chart of the Connection Traffic Initial Allocation procedure according to the present invention.

Once the Alternate Path Database Fill-up procedure is complete, the reserved connections handled by the local Transit Connection Manager (TCM) are allocated in an optimal manner on these alternate paths. The available bandwidth on these alternate paths p ($\hat{C}_{A,p}$) is reserved according to the traffic and the requested quality-of-service. First, traffic sensible to delay and packet loss, and after, traffic more tolerant to delay and packet loss. The traffic characteristics are recorded in the Connection Table (CT) where each connection controlled by the Transit Connection Manager (TCM) is described in term of bandwidth and quality-of-service. The Connection Table (CT) is accessible by the Alternate Path Manager (APM) which selects the connections to reroute according to the requested bandwidth and quality-of-service. When a connection is selected, the Alternate Path Manager extracts the current outbound link and then, search in the Path Table (410) an alternate path having this outbound link as Parent Link (416) and capable to offer sufficient available bandwidth. Once it is done, the Alternate Path Manager (APM) adds into the List of Rerouted Connections (415) of the selected alternate path said connection with its characteristics. FIG. 13 shows a general flow chart of this procedure:

(1300): Start of the procedure.

(1301): A test determines whether or not it remains at least one connection to process in the Connection Table (CT).

(1310): If all connections have been processed, the procedure is complete.

(1302): If at least one connection in the Connection Table (CT) has not been processed, a test determines whether or not it remains at least one real-time connection to process in the CT. The design choice is to reroute in priority real-time connections in order to minimize the overall impact of the path switching at end user level.

(1308): If all real-time connections in the Connection Table (CT) have been processed, the Alternate Path Manager searches in the CT at least one non real-time connection to process.

If all non real-time connections in the Connection table (CT) have been processed, the procedure returns to step (1310).

If at least one non real-time connection in the CT has not been processed, The procedure goes on with step (1309).

(1309): The first non real-time connection to process is selected and the procedure goes on with step (1304).

(1303): If at least one real-time connection in the Connection Table (CT) has not been processed, the first real-time connection to process is selected and the the procedure goes on with step (1304).

(1304): The outbound link is retrieved from the current connection path.

(1305): The Alternate Path Manager searches in the Path Table an alternate path able to support this connection in case of failure of said outbound link.

(1311): If no alternate path is found, the connection is removed from the list and the process goes on with the next connection.

(1306) If an alternate path is found, a test determines whether or not there is enough Remaining Available Capacity along the path ($\hat{C}_{A,p}$) to accept the connection ($\hat{C}_{A,p} \geq \hat{c}_k$). The capacity of the connection k can be a mean bandwidth, or a function of the mean and peak rate, called equivalent capacity $\hat{c}_k$.

(1307): If such an alternate path exists, the connection is added in the List of Rerouted Connections (415) and the Remaining Available Capacity $\hat{C}_{A,p}$ is reduced of the connection equivalent capacity $\hat{c}_k$.

If an alternate path does not exists, the connection cannot be rerouted. (in this case, the network owner has not provided enough resources to be able reroute all its connections)

Connection Allocation Update Procedure

Figure 14:
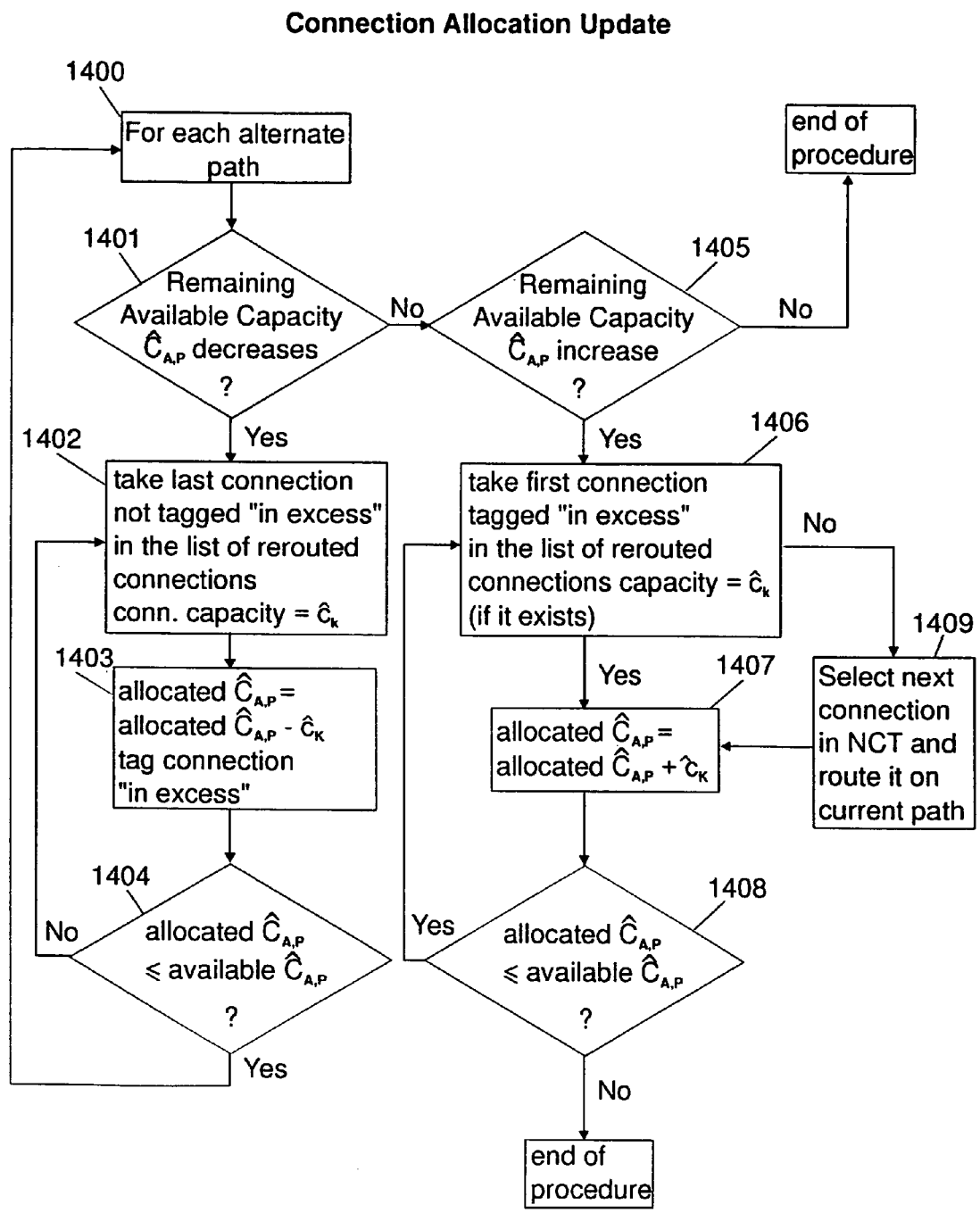
FIG. 14 shows a detailed flow chart of the Connection Allocation Update procedure according to the present invention.

As all the links in the network, the Remaining Available Capacity of alternate paths, changes in function of the variation of the traffic. Thus, as shown in FIG. 14, the Alternate Path Manager (APM) must consider this fact in order to modify the list of connections associated with the various alternate paths:

(1401): If the Remaining Available Capacity of a link used in an alternate path is coming to decrease, the Alternate Path Manager must de-allocate a certain number of connections from the list of connections associated to this alternate path.

(1405): On the other hand, if the remaining available bandwidth of a link used in an alternate path is coming to increase, the Alternate Path Manager (APM) can select in the Connection Table (CT) additional connections to take profit of this new opportunity.

In practice the traffic on links varies frequently, and it seems very difficult for the Alternate Path Manager (APM) to be fully responsive upon these frequent variations. The Connection Allocation Update procedure according to the present invention offers a good trade-off between complexity and the efficiency:

When the Remaining Available Capacity $\hat{C}_{A,p}$ decreases (1401), the Origin Alternate Path Manager (OAPM) immediately searches in the Link Table (420) the different Parent Paths (424). For each alternate path found, some connections in the List of Rerouted Connections (415) are tagged "in excess" (1402, 1403). If a rerouting process occurs, the connections tagged "in excess" are not rerouted by the local Transit Connection Manager (TCM). Obviously the Alternate Path Manager (APM) tags connections in such a way that the sum of the bandwidth reserved by these tagged connections just offsets the lack of recorded Remaining Available Capacity (1403). The List of Rerouted Connections (415) contains real-time connections first, and non real-time connections at the end. The tagging process begins from the tail of the list first. The real-time connections should not be affected by this process because only non real-time connections are tagged "in excess".

When the Remaining Available Capacity increases (1405), the traffic allocation is under-booked and it is possible to add a certain number of connections in the List of Rerouted Connections (415). In this case the Alternate Path Manager (APM) removes the tag "in excess" of a certain number of connections so that the sum of the bandwidth collected just offsets the gain of the Remaining Available Capacity (1406, 1407, 1408). If this process is unable to use all the gain of the Remaining Available Capacity, new connections are added into the List of Rerouted Connections (415) to take profit of this remaining opportunity (1409).

The described process being complex and long, it is unacceptable to execute it in real-time. A good trade-off consists in periodically rebuilding the Alternate Path Database, when the Time-to-Live parameter expires and in reviewing, at this occasion, the list of rerouted connections.

Connection Set-Up Request Procedure

Once the initial allocation is complete, the Alternate Path Manager (APM) sends to the Transit Connection Manager (TCM) the list of connections to setup for each alternate path selected. These connections are then set up but no traffic is routed on these paths. In particular, the labels associated to the connections are loaded in the routing tables but are not activated.

Connection Rerouting Start Request Procedure

The Alternate Path Manager (APM) is a Topology Database subscriber for the links comprised in its alternate paths. When a change occurs on any link contained in its Links Table (420), the Alternate Path Manager (APM) is informed. When a failure occurs, the Alternate Path Manager:

receives from the Topology Database (TDB) a Link Change Update message indicating the link in failure.

retrieves from the Link Table (420) the list of the Parent Paths (424) associated with said link in view of rerouting the connections.

retrieves from the Path Table (410) the list of connections rerouted on these Parent Paths.

immediately sends to the Transit Connection Manager (TCM) the List of Rerouted Connections (415), taking into account the connections tagged "in excess" (no rerouting request for connections tagged "in excess").

The procedures for finding alternate paths and pre-establishing connections on said paths are executed in background.

Path Establishment and Path Activation

The rerouting of the traffic in case of link failure, involves the steps of:

1. identifying an alternate path and storing said path in the Alternate Path Database (APD).
2. triggering the set up on the alternate path,
3. activating the alternate path.

Steps 1 and 2 are executed in background while step 3 is activated when a link failure occurs.

Figure 10:
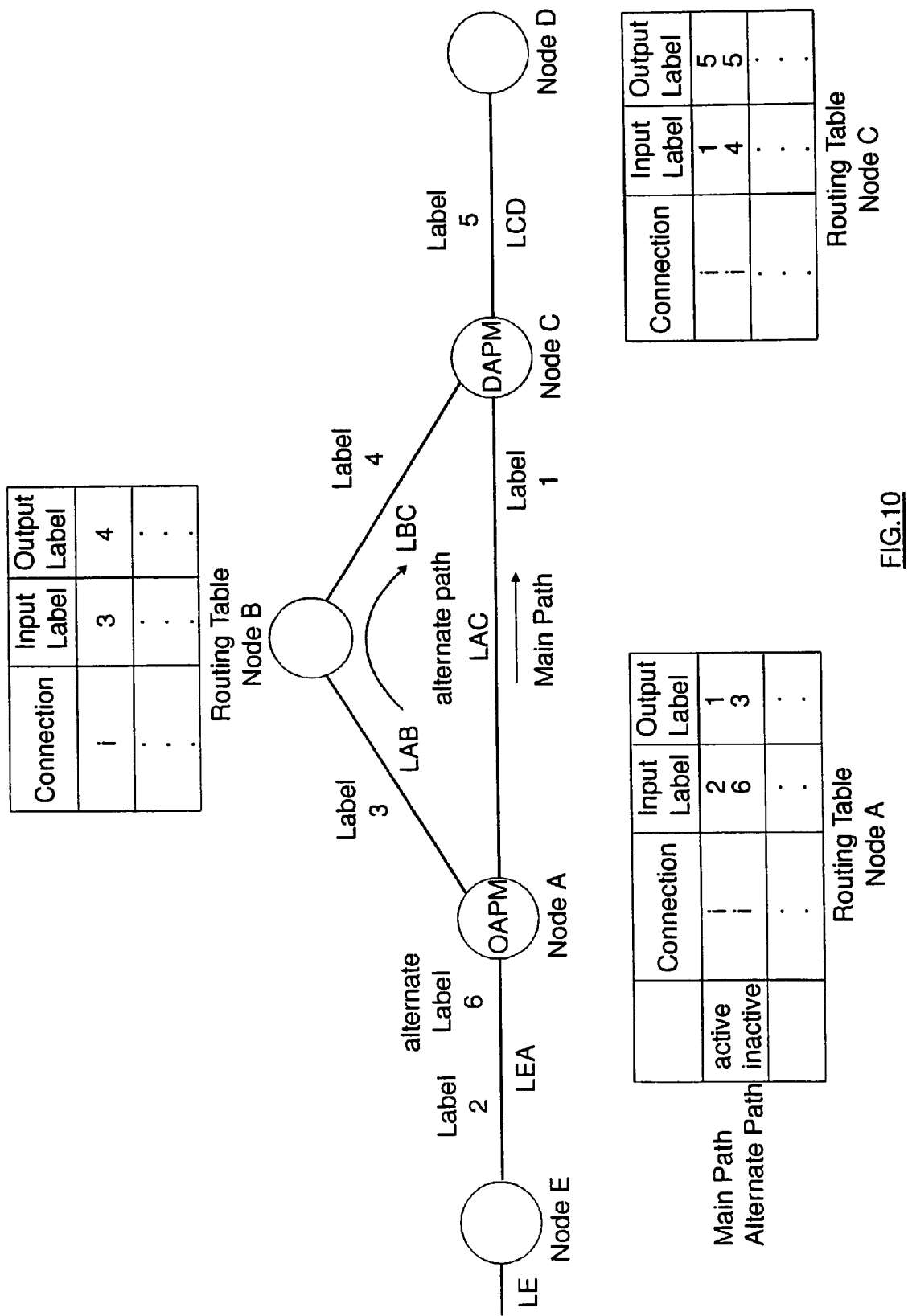
FIG. 10 shows the setting of the routing tables for a given connection along the main path and an alternate path according to the present invention.

Once an alternate path is identified, an Alternate Path Connection Setup is triggered. This process is identical to a connection setup with a single exception, the routing table is not enabled in the origin node. Two paths are converging to the same destination, but only one path activated. As illustrated in FIG. 10, the Origin Alternate Path Manager (OAPM) monitors the main path while the alternate path is in standby mode.

If the OAPM detects a failure on the main path, it then activates the alternate path with the consequence of disabling the main path in the origin node. This path switching can be very fast since it only requires a local update of the routing table; there is no action in the other tables of the network since the alternate path is already set.

Alternate Path Setup

When a new connection is setup, the Origin Alternate Path Manager (OAPM) searches an alternate path. Once such a path is found, an alternate path setup message is sent. This message is similar to any standard connection setup message and is transmitted using, in a preferred embodiment, an Automatic Network Routing mode (ANR) with reverse path accumulation to identify the path. The ANR string comprises:

an identifier of the Origin Alternate Path Manager (OAPM) (located in node A), an identifier of the Destination Alternate Path Manager (DAPM) (located in node C), identifiers of the links along the path (for instance along links LAB, LBC, LCD).

Each time the message crosses a node, the link identifier at the top of the ANR string is stripped off and the identifier of the link from where the message was received is added to the reverse ANR string. Referring to FIG. 10, the header of the set up message message is structured as follows:

Alternate path set up message entering into first node A:

Alternate path set up message entering into second node B:

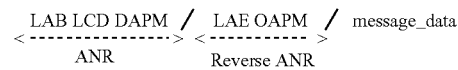

Alternate path set up message entering into third node C:

Note: LAB identifies the link going from node A to node B while LBA identifies the link going from node B to node A. RANR is used for "Reverse Automatic Network Routing".

The alternate path set up message is processed by the Transit Connection Manager (TCM) as any connection setup message with one exception for the first TCM along the alternate path (located in node A). This first TCM:

selects for each connection i an alternate input label which replaces the original input label when the alternate path (links LAB, LBC) is activated.

raises an Alternate Path Flag (APF) to indicate which input label between the original (2) and the alternate label (6) must be used in the routing table.

The following process is then executed:

If the APF flag is not raised, the original input label (2) in the routing table of the first node A is activated for connection i.

If the APF flag is raised, the alternate input label (6) is activated for said connection i.

The Destination Alternate Path Manager (DAPM in the last node C) is in charge of connecting the input label selected on the alternate path (4) to the original output label of the main path (5). (The Transit Connection Manager (TCM) and the Alternate path Manager (APM) are actually the same component. The TCM knows it must act as a APM thanks to the OAPM identifier it finds in the ANR string).

Once the setup is completed, an alternate path (links LAB, LBC) is setup and enabled in every node except in the first node A. In the first node A, everything is in place but the routing table is not activated.

Alternate Path Activation

The Origin Alternate Path Manager (OAPM) (in node A) is now monitoring the main path. Any failure on the main path triggers the activation of the alternate path. As this path is already setup in the network, no message needs to be sent to the other nodes of the network. The OAPM merely updates the routing tables to switch from the original path to the new one. As soon as this switch is performed, traffic can flow on the alternate path. The path switching can be very fast since it is only a local action. The OAPM then records the alternate path as the main path and starts to look for a new alternate path . . . .

The invention claimed is:

1. A method for operating a node in a computer network, the node connected to other nodes by links, comprising:
   determining a path to a destination, the path including one or more links;
   determining at least one alternate path having at least some of its one or more links differing from the links of the path;
   reserving bandwidth for said at least one alternate path by sending one or more set-up request messages;
   enabling said at least one alternate path at one or more other nodes along said at least one alternate path, but not enabling said at least one alternate path at the node, wherein the node is a head node of said at least one alternate path;
   subsequent to reserving bandwidth and enabling, detecting a link failure on the path; and
   rerouting traffic on said at least one alternate path in case of a link failure by enabling said at least one alternate path in the node, and absent sending any additional set-up messages to the one or more other nodes along said at least one alternate path.

2. The method as in claim 1, further comprising:
   periodically updating said at least one alternate path.

3. The method as in claim 1, further comprising:
   determining a plurality of alternate paths for the path, and said plurality of alternate paths do not have any link in common.

4. The method as in claim 1, further comprising:
   rerouting user traffic substantially simultaneously to each link of said at least one alternate path.

5. The method as in claim 1, further comprising:
   reserving bandwidth on said at least one alternate path for switching real-time connections first.

6. The method as in claim 1, further comprising:
   sending one or more set-up request messages to one or more nodes associated with each of the one or more alternate paths, to allocate a connection along each of the one or more alternate paths;
   maintaining the connection along each of the one or more alternate paths in a standby mode; and
   in response to a link failure on the path, activating the connection along at least one of the one or more alternate paths.

7. A node in a computer network connected by links, said node comprising:
   means for determining a path to a destination, the path including one or more links;
   means for determining at least one alternate path having at least some of its one or more links differing from the links of the path;
   means for reserving bandwidth for said at least one alternate path prior to detecting a link failure on the path by sending one or more set-up request messages;
   means for enabling said at least one alternate path at one or more other nodes along said at least one alternate path, but not enabling said at least one alternate path at the node, wherein the node is a head node of said at least one alternate path; and
   means for rerouting traffic on said at least one alternate path in case of a link failure by enabling said at least one alternate path in the node, and absent sending any additional set-up messages to the one or more other nodes along said at least one alternate path.

8. The node as in claim 7, further comprising:
   means for periodically updating said at least one alternate path.

9. The node as in claim 7, further comprising:
   means for determining a plurality of alternate paths for the path, and said plurality of alternate paths do not have any link in common.

10. The node as in claim 7, further comprising:
    means for rerouting user traffic substantially simultaneously to each link of said at least one alternate path.

11. The node as in claim 7, further comprising:
    means for reserving bandwidth on said at least one alternate path for switching real-time connections first.

12. A node in a computer network connected by links, said node comprising:
    a transit connection manager (TCM) adapted to
        set up transit connections for a path,
        update routing tables,
        route traffic; and
    an alternate path manager adapted to
        determine at least one alternate path for use in case of failure of a link of the path,
        allocate connections on said at least one alternate path prior to a link failure on the path,
        reserve bandwidth on said at least one alternate path prior to a link failure on the path by sending one or more set-up request messages, cause one or more other nodes along said at least one alternate path to enable said at least one alternate path, cause the node to not enable said at least one alternate path, wherein the node is a head node of said at least one alternate path.

request to said TCM the rerouting of traffic on said at least one alternate path in case of a link failure by enabling said at least one alternate path in the node, and absent sending any additional set-up messages to said one or more other nodes along said at least one alternate path.

13. The node according to claim 12, further comprising:
said at least one alternate path is a plurality of alternate paths that each include one or more links and the plurality of alternate paths do not have any link in common.

14. The node according to claim 12, further comprising:
said alternate path manager adapted to reroute user traffic to each link of said at least one alternate path.

15. The node according to claim 12, further comprising:
said alternate path manager adapted to reserve bandwidth on said at least one alternate path for making real-time connections first.

16. The node as in claim 12, wherein the TCM is configured to allocate connections by transmission of one or more set-up request messages to one or more nodes associated with each of the one or more alternate paths, to maintain a connection along each of the one or more alternate paths in a standby mode, and to activate the connection along at least one of the one or more alternate paths in response to a link failure.

17. A method of non-disruptive packet switching in a network having nodes interconnected with transmission trunks, said method comprising:
pre-selecting at least on alternate path for each trunk;
reserving connections at each node to make said at least one alternate path;
reserving bandwidth resources to transmit packets on said at least one alternate path by sending one or more set-up request messages;
enabling said at least one alternate path at one or more nodes along said at least one alternate path, but not enabling said at least one alternate path at a head node of said at least one alternate path;
subsequent to the reserving connections and reserving resources and enabling, detecting a failure of a particular trunk; and
switching the path of a packet from said particular trunk, in response to failure of said particular trunk, to said at least one alternate path by enabling said at least one alternate path in the head node, and absent sending any additional set-up messages to said one or more nodes along said at least one alternate path.

18. The method according to claim 17 further comprising:
said at least one pre-selected alternate path is a plurality of alternate paths that each include one or more trunks, and the plurality of paths do not have any trunk in common.

19. The method according to claim 17 further comprising:
rerouting user traffic to each trunk of said at least one alternate path.

20. The method according to claim 17 further comprising:
reserving resources on said at least one alternate path for making a real-time connection first.

21. A method comprising:
determining a path to a destination, the path including one or more links;
determining at least one alternate path having at least some of its one or more links differing from the links of the path;

sending one or more setup request messages along the at least one alternate path to request one or more nodes along the path reserve resources for, and enable, the at least one alternate path;

reserving resources for, but not enabling, the at least one alternate path at a head node of the at least one alternate path;

subsequent to steps of sending and reserving, detecting a link failure on the path; and rerouting traffic on the at least one alternate path in case of a link failure by enabling the at least one alternate path in the head node, absent sending additional set-up messages to one or more nodes along the at least one alternate path.

22. The method as in claim 21 wherein the resources include bandwidth for passing traffic, and the one or more set-up request messages request the one or more nodes reserve bandwidth for the alternate path.

23. The method as in claim 21 further comprising:
periodically updating the at least one alternate path in response to changes in available bandwidth.

24. The method as in claim 21 wherein the least one alternate path is a plurality of alternate paths that do not have any links in common.

25. An apparatus comprising:
a plurality of ports;
a route controller configured to determine a path to a destination via one of the plurality of ports, the path including one or more links; and
an alternate path manager (AMP) configured to,
determine at least one alternate path via one of the plurality of ports, the at least one alternate path having at least some links that differ from the links of the path,
send one or more set-up request messages along the at least one alternate path to request one or more nodes along the path reserve resources for, and enable, the at least one alternate path,
reserve resources for, but not enable, the at least one alternate path at the apparatus, wherein the apparatus is a head of the at least one alternate path;
detect a link failure on the path, and
reroute traffic on the at least one alternate path in case of a link failure by enabling the at least one alternate path in the apparatus, absent a send of additional set-up messages to one or more nodes along the at least one alternate path.

26. The apparatus as in claim 25 wherein the resources include bandwidth for passing traffic, and the one or more set-up request messages request the one or more nodes reserve bandwidth for the alternate path.

27. The apparatus of claim 25 wherein the AMP is further configured to periodically update the at least one alternate path in response to changes in available bandwidth.

28. The apparatus of claim 25 wherein the least one alternate path is a plurality of alternate paths that do not have any links in common.

29. An apparatus comprising:
means for determining a path to a destination, the path including one or more links;
means for determining at least one alternate path, the at least one alternate path having at least some links that differ from the links of the path;
means for sending one or more set-up request messages along the at least one alternate path to request one or more nodes along the path reserve resources for, and enable, the at least one alternate path;

means for reserving resources for, but not enabling, the at least one alternate path at the apparatus, wherein the apparatus is a head of the at least one alternate path;

means for detecting a link failure on the path; and means for rerouting traffic on the at least one alternate path in case of a link failure by enabling the at least one alternate path in the apparatus, absent sending additional set-up messages to one or more nodes along the at least one alternate path.

* * * * *

UNITED STATES PATENT AND TRADEMARK OFFICE
CERTIFICATE OF CORRECTION

PATENT NO. : 7,593,321 B2  Page 1 of 1
APPLICATION NO. : 10/634060
DATED : September 22, 2009
INVENTOR(S) : Claude Galand It is certified that error appears in the above-identified patent and that said Letters Patent is hereby corrected as shown below:

Col. 1, Line 14, please amend as shown:

ing networks and[[ mor]] more particularly to a method and system for

Col. 4, Line 23, please amend as shown:

still be used while the[[ the]] new path is being[[ be]] set up

Col. 5, Line 44, please amend as shown:

out disruption to an alternate path in[[ cas]] case of failure or unavail-

Col. 6, Line 50, please amend as shown:

toward their final destination at the highest[[ possibl]] possible rate. The

Col. 15, Line 43, please amend as shown:

(TCM) and is responsible for[[ seting]] setting up, maintaining and

Col. 15, Line 47, please amend as shown:

The Destination Alternate Path Manager[[ (BAPM)]] (DAPM) mainly

Signed and Sealed this

Sixteenth Day of November, 2010

David J. Kappos
*Director of the United States Patent and Trademark Office*